(12) United States Patent
Nagase (10) Patent No.: US 9,060,211 B2
(45) Date of Patent: Jun. 16, 2015

(54) METHOD OF COLLECTING DEVICE-CONDITION INFORMATION AND DEVICE-CONDITION INFORMATION COLLECTING KIT USED THEREFOR

(75) Inventor: Mamoru Nagase, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 843 days.

(21) Appl. No.: 13/139,805

(22) PCT Filed: Dec. 7, 2009

(86) PCT No.: PCT/JP2009/070460
§ 371 (c)(1),
(2), (4) Date: Aug. 16, 2011

(87) PCT Pub. No.: WO2010/071040
PCT Pub. Date: Jun. 24, 2010

(65) Prior Publication Data
US 2011/0295561 A1    Dec. 1, 2011

(30) Foreign Application Priority Data

Dec. 17, 2008 (JP) ................................ 2008-321215

(51) Int. Cl.
| | |
|---|---|
| G06F 15/173 | (2006.01) |
| G06F 12/00 | (2006.01) |
| H04W 24/00 | (2009.01) |
| H04Q 9/00 | (2006.01) |
| G05B 19/418 | (2006.01) |

(52) U.S. Cl.
CPC .............. *H04Q 9/00* (2013.01); *G05B 19/4183* (2013.01); *G05B 2219/31282* (2013.01); *G05B 2219/31319* (2013.01); *H04Q 2209/40* (2013.01); *H04Q 2209/50* (2013.01)

(58) Field of Classification Search
CPC ....... G06F 15/173; G06F 12/00; G06F 12/02; G06F 3/01; H04W 24/00; H04W 4/00
USPC ........... 702/188, 45, 50–51, 82–85, 127, 130, 702/138, 189; 340/539.22–539.24, 539.26, 340/605, 632, 679; 700/9, 21, 108–110
See application file for complete search history.

(56) References Cited

U.S. PATENT DOCUMENTS

| | | | | |
|---|---|---|---|---|
| 2002/0120422 | A1* | 8/2002 | Nagase ........................ | 702/127 |
| 2004/0122602 | A1* | 6/2004 | Nagase .......................... | 702/51 |
| 2006/0122808 | A1* | 6/2006 | Quake et al. .................. | 702/183 |

FOREIGN PATENT DOCUMENTS

| | | |
|---|---|---|
| CN | 2632633 Y | 8/2004 |
| CN | 101113673 A | 1/2008 |
| JP | 60181941 A | 9/1985 |
| JP | 2272665 A | 11/1990 |

(Continued)

*Primary Examiner* — Toan Le
(74) *Attorney, Agent, or Firm* — The Webb Law Firm (57) ABSTRACT

Accurate device-condition information of and relating to a number of devices to be managed are collected in an efficient manner. The number of devices to be managed are divided between a direct collection group including some managed devices whose device-condition information are collected by detecting operation by a portable (mobile) unit for device condition detection on each one of these managed devices and an indirect collection group including the other managed devices whose device-condition information are collected by communication between each one of these managed devices and a stationary unit disposed to be capable of detecting the device-condition information of the device.

13 Claims, 6 Drawing Sheets

(56) References Cited

FOREIGN PATENT DOCUMENTS

| | | |
|---|---|---|
| JP | 7222267 A | 8/1995 |
| JP | 9198103 A | 7/1997 |
| JP | 10-188190 A | 7/1998 |
| JP | 10-255190 A | 9/1998 |
| JP | 11-296775 A | 10/1999 |
| JP | 2001-222785 A | 8/2001 |
| JP | 2001-266283 A | 9/2001 |
| JP | 2002-290318 A | 10/2002 |
| JP | 2003-132476 A | 5/2003 |
| JP | 2004-062510 A | 2/2004 |
| JP | 2005-114409 A | 4/2005 |

* cited by examiner

METHOD OF COLLECTING DEVICE-CONDITION INFORMATION AND DEVICE-CONDITION INFORMATION COLLECTING KIT USED THEREFOR

TECHNICAL FIELD

The present invention relates to a technique for collecting information for use in appropriately effecting replacement, repair of a number of devices to be managed that are installed in a factory or a plant (e.g. valve devices represented by steam traps, fluid handling devices represented by pumps, etc.) (e.g. information relating to whether the device is under normal or abnormal condition, or information relating to a temperature for use in such assessment, etc.)

BACKGROUND ART

Conventionally, as methods of collecting device-condition information of steam traps as an example of devices to be managed, methods (1) and (2) as follows are known.

(1) Direct collection method: By a contacting operation (an example of detecting operation) of a compact information collecting unit having a sensor for sensing ultrasonic oscillation and temperature on an outer surface of a steam trap (an example of a portable unit for device condition detection) with each of the number of steam traps, device-condition information of respective ones of the number of steam traps are collected one after another (see Patent Document 1 identified below).

(2) Indirect collection method: For and in correspondence with each steam trap, there is provided a stationary information collecting unit having a sensor for detecting ultrasonic oscillation and temperature of the outer surface of steam trap, the collecting unit being set in contact with the outer surface of the steam trap corresponding thereto, and via wireless communication between each one of these information collecting units and a central control apparatus, device-condition information of the number of steam traps are collected (see Patent Document 2 identified below).

PRIOR ART DOCUMENTS

Patent Documents

Patent Document 1: Japanese Unexamined Patent Application Publication No. 2005-114409
Patent Document 2: Japanese Unexamined Patent Application Publication No. 2003.132476

SUMMARY OF THE INVENTION

Object to be Achieved by Invention

However, with the direct collection method described in (1) above, this method requires a detecting operation by a collecting person for each of the number of steam traps installed in a factory (i.e. a detecting operation using an information collecting unit). Moreover, because of the nature of the device management, it is difficult to implement, at appropriate timing and with appropriate frequency, a one-time operation mode mobilizing a group of information collecting persons for obtaining device-condition information accurately reflecting the conditions and actual situations of the respective steam traps. Hence, the method would require mobilization of a great number of information collecting persons for collecting device-condition information, thus the method being not efficient in the respect of the time and costs required for information collection.

On the other hand, in the case of the indirection information collection method described in (2) above, the method requires the same number of sensors as the number of many steam traps in the factory and the method also requires each information collecting unit to have a communication facility. Hence, the system costs of the sensors and the collecting units are high, so that this method too suffers inefficiency in the respect of information collection costs.

In view of the above-described state of the art, the principal object of the present invention is to provide a device-condition information collecting method capable of collecting accurate device-condition information of a number of devices to be managed in an efficient manner as well as a device-condition information collecting kit for use in the method.

Means for Achieving the Object

According to the first characterizing feature of the present invention, there is provided a device-condition information collecting method for collecting device-condition information of each of a number of devices to be managed, the method being characterized in that:

the number of devices to be managed are divided between a direct collection group comprised of some managed devices whose device-condition information are collected by detecting operation by a portable unit for device condition detection on each of the managed devices and an indirect collection group comprised of the other managed devices whose device-condition information are collected by a communication between each of these managed devices and a stationary unit disposed to be capable of detecting the device-condition information of the device.

With the above-described characterizing feature, the managed devices are divided into at least two kinds of collection groups, i.e. the direct collection group on which the direct collection method is implemented and the indirect collection group on which the indirect collection method is implemented. Therefore, it becomes possible to employ whichever collection method to suit the particular situation (e.g. type, installed location, the importance) of each of the managed devices and the actual current conditions thereof (frequency of trouble occurrence, the probability of trouble occurrence) for collecting the device-condition information of each managed device. Hence, the accurate device-condition information of the many devices to be managed can be collected in an efficient manner.

According to the second characterizing feature of the present invention, which is a preferred mode of embodying the first characterizing feature, the managed devices belonging in the indirect collection group are further divided into a first indirection collection group whose device-condition information are collected by the communication between the stationary unit and the central control apparatus and a second indirect collection group whose device-condition information are collected by communication between said stationary unit and said portable unit.

That is, according to the above-described arrangement, the managed devices belonging in the indirect collection group are further divided into a first indirection collection group that do not require at all a carrying operation and other control operations of the portable unit by a collecting person and a second indirect collection group that require only a smell amount of operations by the person for carrying and controlling the portable device. Therefore, by assigning those managed devices that suffer high frequency of trouble occurrence and/or have great importance to the first indirect collection group and, the process of collecting the device-condition information of the managed devices can be carried out in an even more efficient manner.

According to the third characterizing feature of the present invention, which is a preferred mode of embodying the second characterizing feature, the method comprises the further steps of:

setting frequency of collecting the device-condition information on each of the number of devices to be managed;

setting the managed devices to be included in the direct collection group from those managed devices having a same collection frequency set thereon; and setting all or some of the managed devices having different collection frequency than the managed devices set for the direct collection group, as the devices to be included in the first indirect collection group.

According to the above-described charactering feature, the devices of the direct collection group are selected from those managed devices set with a same collection frequency. Therefore, for these devices, the information collecting operation by a collecting person can be done at a time on a same work day/period in an efficient manner. With this, even greater improvement in the efficiency of the device-condition collecting operation can be achieved.

Incidentally, the setting of collection efficiency can be done appropriately, such as every 30 seconds, every hour, every year, etc., or every desired unit time, every fixed time of the day, or full-time (or nearly full-time).

According to the fourth characterizing feature of the present invention, which is a preferred mode of embodying the third characterizing feature, the method comprises the further steps of:

determining, for each of those managed devices having a same collection frequency set thereon, whether the direct collection of the device-condition information using the portable unit is appropriate therefor or not; and setting some or all of the managed devices determined to be appropriate for the direct collection to the direct collection group while setting some or all of the managed devices determined to be not appropriate for the direct collection to the second indirect collection group.

With the above-described arrangement, for each of the managed devices set with a same collection frequency, determination is made whether the direct collection is appropriate therefor or not, in accordance with such determination indices as workability, safety of the information collecting person, based on the installment situation thereof. Then, the devices can be divided between the direct collection group that require a detecting operation by the information collecting person and the second indirect collection group that do not require a detecting operation by the information collecting person. With this, even greater improvement in the efficiency of the device-condition collecting operation can be achieved.

According to the fifth characterizing feature of the present invention, there is provided a device-condition information collecting kit, characterized in that:

a device-condition information collecting kit for use in a method of collecting device-condition information of each of a number of devices to be managed, characterized in that:

the kit comprises:

a portable unit for device-condition detection, the portable unit being capable of collecting the device-condition information from each managed device by a detecting operation thereon;

a stationary unit disposed to be capable of detecting the device-condition information of the managed device, the stationary unit being capable of communicating the device-condition information; and a central control apparatus capable of collecting the device-condition information by communicating with the stationary unit.

With the above-described arrangement, the managed devices are divided into at least two kinds of collection groups, i.e. the direct collection group on which the direct collection method is implemented and the indirect collection group on which the indirect collection method is implemented. Therefore, it becomes possible to employ whichever collection method to suit the particular situation (e.g. type, installed location, the importance) of each of the managed devices and the actual current conditions thereof (frequency of trouble occurrence, the probability of trouble occurrence) for collecting the device-condition information of each managed device. Hence, the accurate device-condition information of the many devices to be managed can be collected in an efficient manner.

According to the sixth characterizing feature of the present invention, there is provided a device-condition collecting kit, a device-condition information collecting kit for use in a method of collecting device-condition information of each of a number of devices to be managed, characterized in that:

the kit comprises:

a portable unit for device-condition detection, the portable unit being capable of collecting the device-condition information from each managed device by a detecting operation thereon; and a stationary unit disposed to be capable of detecting the device-condition information of the managed device, the stationary unit being capable of wirelessly communicating the device-condition information;

wherein said portable unit is configured to be capable of collecting the device-condition information by wirelessly communicating with the stationary unit.

With the above-described, arrangement, the managed devices are divided into at least two kinds of collection groups, i.e. the direct collection group on which the direct collection method is implemented and the indirect collection group on which the indirect collection method is implemented. Therefore, it becomes possible to employ whichever collection method to suit the particular situation (e.g. type, installed location, the importance) of each of the managed devices and the actual current conditions thereof (frequency of trouble occurrence, the probability of trouble occurrence) for collecting the device-condition information of each managed device. Hence, the accurate device-condition information of the many devices to be managed can be collected in an efficient manner.

According to the seventh characterizing feature of the present invention, there is provided a device-condition information collecting kit, characterized in that:

a device-condition information collecting kit for use in a method of collecting device-condition information of each of a number of devices to be managed, characterized in that:

the kit comprises:

a portable unit for device-condition detection, the portable unit being capable of collecting the device-condition information from each managed device by a detecting operation thereon;

a stationary unit disposed to be capable of detecting the device-condition information of the managed device, the stationary unit being capable of wirelessly communicating the device-condition information; and a central control apparatus capable of collecting the device-condition information detected by the stationary unit by wirelessly communicating with this stationary unit;

wherein said portable unit is configured to be capable of collecting the device-condition information detected by the stationary unit by wirelessly communicating with the stationary unit.

With the above-described arrangement, the managed devices are divided into at least two kinds of collection groups, i.e. the direct collection group on which the direct collection method is implemented and the indirect collection group on which the indirect collection method is implemented. Therefore, it becomes possible to employ whichever collection method to suit the particular situation (e.g. type, installed location, the importance) of each of the managed devices and the actual current conditions thereof (frequency of trouble occurrence, the probability of trouble occurrence) for collecting the device-condition information of each managed device. Hence, the accurate device-condition information of the many devices to be managed can be collected in an efficient manner.

Further, the managed devices belonging in the indirect collection group are further divided into a first indirection collection group that do not require at all a carrying operation and other control operations of the portable unit by a collecting person and a second indirect collection group that require only a small amount of operations by the person for carrying and controlling the portable device. Therefore, by assigning those managed devices that suffer high frequency of trouble occurrence and/or have great importance to the first indirect collection group and, the process of collecting the device-condition information of the managed devices can be carried out in an even more efficient manner.

According to the eighth characterizing feature of the present invention, which is a preferred mode of embodying the seventh characterizing feature, said stationary unit includes a first stationary unit for wireless communication with said central control apparatus and a second stationary unit for wireless communication with said portable unit, said second stationary unit having a shorter wireless communicable distance than said first stationary unit.

With the above-described arrangement, collection of the device-condition information of the second collection group can be done effectively with movement of the movable unit relative to, i.e. toward the second stationary unit and at the same time, this second stationary unit can be a unit which is less costly and consumes less power than the first stationary unit. Hence, even further improvement in the efficiency of the device-condition information collection is made possible.

According to the ninth characterizing feature of the present invention, there is provided a device-condition information collecting unit for use in the device-condition information collecting method according to any one of the second through fourth characterizing features described above, the kit being characterized in that:

the kit comprises said portable unit, said stationary unit and said central control apparatus.

With the above-described arrangement, the managed devices are divided into at least two kinds of collection groups, i.e. the direct collection group on which the direct collection method is implemented and the indirect collection group on which the indirect collection method is implemented. Therefore, it becomes possible to employ whichever collection method to suit the particular situation (e.g. type, installed location, the importance) of each of the managed devices and the actual current conditions thereof (frequency of trouble occurrence, the probability of trouble occurrence) for collecting the device-condition information of each managed device, in the respects of collection frequency (timing), period required for collection, the collection work efficiency, the collection work cost, the system/device cost, etc. Hence, the accurate device-condition information of the many devices to be managed can be collected in an efficient manner.

Further, the managed devices belonging in the indirect collection group are further divided into a first indirection collection group that do not require at all a carrying operation and other control operations of the portable unit by a collecting person and a second indirect collection group that require only a small amount of operations by the person for carrying and controlling the portable device. Therefore, by assigning those managed devices that suffer high frequency of trouble occurrence and/or have great importance to the first indirect collection group and, the process of collecting the device-condition information of the managed devices can be carried out in an even more efficient manner.

According to the tenth characterizing feature of the present invention, which is a preferred mode of embodying the ninth characterizing feature, said portable unit is configured to be capable of collecting also the device-condition information of the managed devices of the first indirect collection group via the wireless communication with the stationary units operatively connected to these managed devices of the first indirect collection group.

With the above-described arrangement, according to the situation of the managing person and/or the central control apparatus (e.g. the maintenance, security, etc.) and/or the situation of the information collecting person (e.g. the number of the information collecting persons, the work efficiency of the information collecting operation, etc.), for some or all of the managed devices of the first indirect collection group, the device-condition information thereof can be collected via the wireless communication between the respective stationary units and the portable unit.

According to the eleventh characterizing feature of the present invention, which is a preferred mode of embodying the ninth or tenth characterizing feature, via the wireless communication between the portable unit and the central control apparatus, the device-condition information of the direct collection group, the device-condition information of the first indirect collection group and the device-condition information of the second indirect collection group can be stored altogether in a storing section of said portable unit and/or a storing section of said central control apparatus.

With the above-described arrangement, with the wireless communication between the portable unit and the central control apparatus, centralization of the device-condition information of the respective managed devices can be realized easily.

MODES OF EMBODYING THE INVENTION

Figure 1:
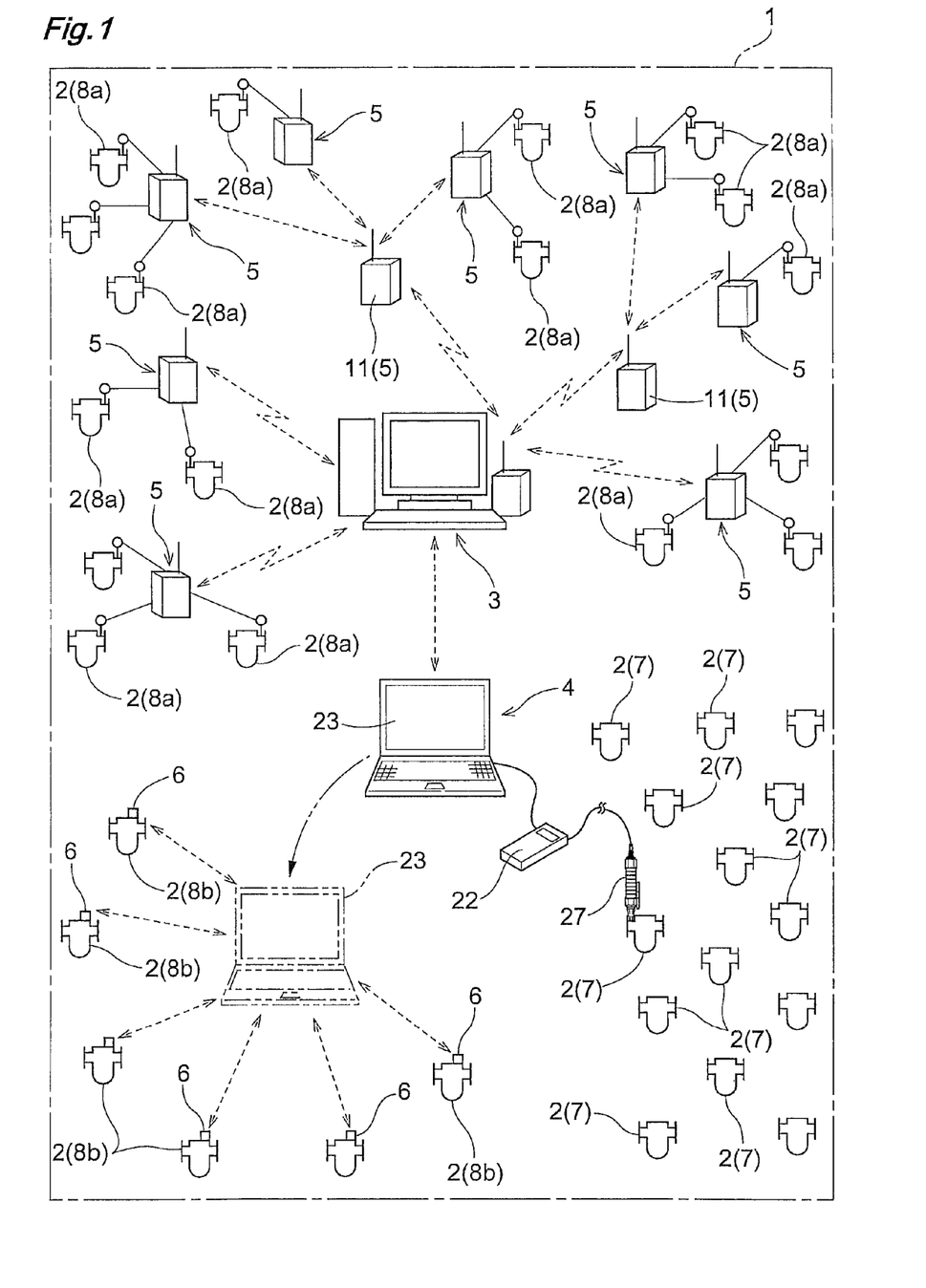
FIG. 1 a system construction diagram of a facility.

FIG. 1 shows a management system using a device-condition information collecting kit for collecting device-condition information for device management on each of a great number of steam traps 2 ("traps" hereinafter) disposed in distribution within a facility 1, such as a factory or plant using steam.

The collecting kit includes a central control apparatus 3, a portable unit 4 for device-condition information collection, capable of collecting device-condition information of each trap 2 by a detecting operation thereon, and a plurality of first and second stationary units 5, 6 that can be disposed to be capable of detecting device-condition information of each trap 2 and that are capable of wirelessly communicating the detected device-condition information.

And, with this system, the respective ones of many traps 2 are divided into a direction collection group 7 whose device-condition information are collected by a detecting operation by the portable unit 4 on each trap 2 and an indirect collection group whose device-condition information are collected via wireless communication (an example of communication) with the first and second stationary units 5, 6 disposed to be capable of detecting device-condition information of each trap 2.

Further, for the traps 2 belonging in the indirect collection group, these traps 2 are further divided into a first indirect collection group 8a whose device-condition information are collected via wireless communication between the first stationary units 5 respectively corresponding thereto and the central control apparatus 3 and a second indirect collection group 8b whose device-condition information are collected via wireless communication between the second stationary units 6 respectively corresponding thereto and the portable unit 4.

Figure 2:
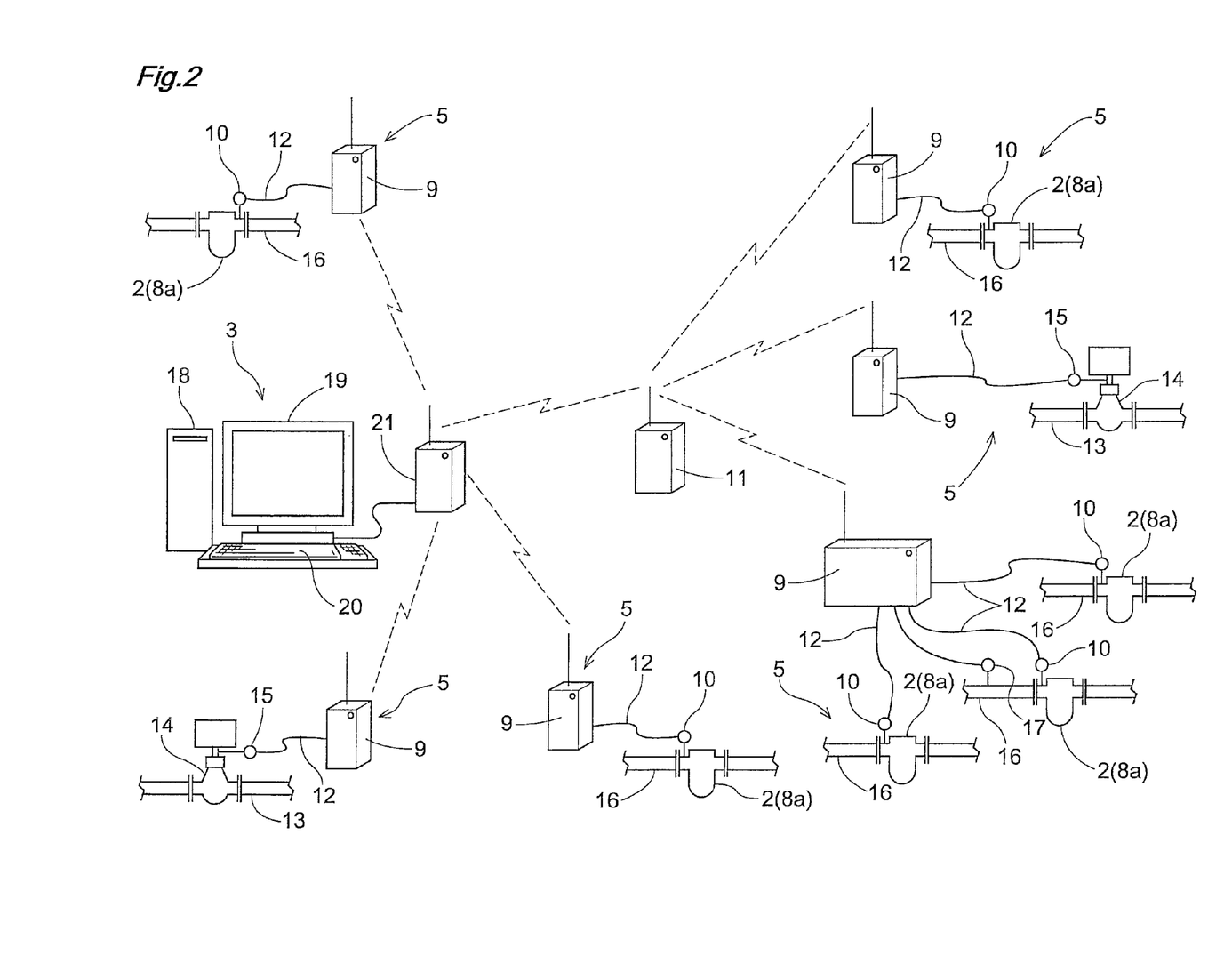
FIG. 2 a system construction diagram of a first indirect collection group.

Referring to each of the first stationary unit 5, as shown in FIG. 2, the unit includes a terminal device 9 communicating information with the central control apparatus 3 via wireless communication, a sensor 10 provided for each trap 2 and a relay device 11 to be disposed at a location where the wireless communication between this first stationary unit 5 and the central control apparatus 3 can become troubled or inoperative due to e.g. the distance, presence of an obstacle, etc. In the figure, numeral 12 denotes a leading wire which interconnects the terminal device 9 and the sensor 10.

The terminal device, 9, though not shown, includes a digital circuit section using a digital processor, an analog circuit section to which the sensor 10 is connected, a communicating section for transmitting/receiving information with using antenna, a power cell, a storing section for storing setting information, etc.

And, referring to the functions of this terminal device 9, in accordance with setting information provided via the wireless communication from the central control apparatus 3, the device 9 inputs detection information of the connected sensor 10 at the set frequency (e.g. every day/hour of the day, full-time or nearly full-time) and effects digital processing on the inputted sensor information and transmits the processed information to the central control apparatus 3 and also receives instruction information from the central control apparatus 3.

As the sensors 10, there are provided three kinds of them, i.e. an oscillation/temperature sensor, an oscillation sensor and a temperature sensor. Hence, depending on e.g. the type of each trap 2 and an item to be managed or monitored, one of these three kinds is employed. The oscillation/temperature sensor is configured to detect three kinds of items, i.e. the ultrasonic level oscillation of the trap 2 (an example of "device-condition information"), the temperature of the trap 2 (another example of the "device-condition information") and the ambient temperature of the trap 2 (still another example of the "device-condition information"). The oscillation sensor is configured to detect only the ultrasonic level oscillation of the trap 2. The temperature sensor is configured to detect only the temperature 2 of the trap 2 and the ambient temperature of the trap 2.

Incidentally, to the analog circuit section of each terminal device 9, in addition to the sensor 10 described above, there are also connected via lead wires 12 appropriately, an opening/closing sensor 15 for detecting an opened/closed condition (still another example of the "device-condition information") of a valve 14 incorporated within a steam feed pipe 13 of a steam line incorporating each trap 2 and a pressure sensor 17 for detecting a pipe pressure (still another example of the "device-condition information") inside a condensate pipe 16 connected to each trap 2.

The central control apparatus 3 comprises a personal type computer proper 18 having an internal CPU (an example of "calculating section") and an internal hard disc (an example of "storing section"), peripheral devices connected thereto including a display device 19 (an example of "displaying section") and a keyboard 20 (an example of "controlling section"), and a wireless modem 21 for effecting wireless communication.

The internal hard disc of the central control apparatus 3 houses therein a management database for storing information for each of the traps 2 to be managed, such as trap property information (e.g. the type, manufacturer, the use, the pressure, etc.), trap diagnosis result information (example of the "device-condition information", e.g. information of whether the device is normal or not, the type of trouble developed therein such as steam leak, temperature abnormality, etc, the amount of steam leak), trap reference information (e.g. the number of occurrence of troubles, date/time of information collection (date of diagnosis)), trap group information indicating a collection group in which the trap belongs, the sensor detection information, in correlation with trap ID information (the serial area number, the serial trap number).

And, based on the sensor detection information transmitted from each terminal device 9, the internal CPU (the internal CPU of the computer proper 18) of the central control apparatus 3 diagnoses each trap 2 and records the information of the result of this diagnosis (the "trap diagnosis result information"), extracted trap reference information together with the sensor detection information and the operation number detection information, in accumulation (i.e. with leaving and keeping the archival information), in the above-described management database.

That is, for each of the traps 2 belonging in the first indirect collection group 8a, there is implemented a collecting method according to which via the wireless communication between the terminal device 9 of the first stationary unit 5 and the central control apparatus 3 (either the direct wireless communication or the indirect wireless communication via the relay processing by the relay device 1), the device-condition information detected by the sensor 10 of the first stationary unit 5 is recorded in the management database inside the internal hard disc of the central control apparatus 5.

Figure 3:
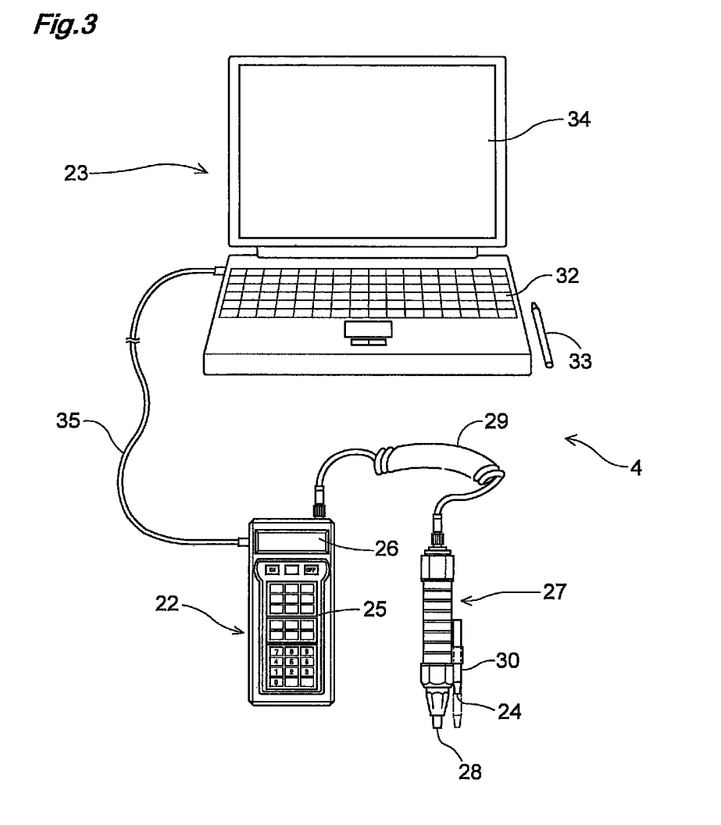
FIG. 3 a perspective view of a portable unit.

The portable unit 4, as shown in FIG. 3, consists of a portable mobile type diagnosing device (information collecting device) 22, a portable personal computer ("portable computer" hereinafter) 23 and an ID tag reader 24.

The diagnosing device 22 includes keys 25 (an example of "controlling section"), a compact display 26 (an example of "displaying section"), an internal CPU (an example of "calculating section"), and an internal memory (an example of "storing section"). This diagnosing device 22 is operated in response to execution of a diagnosing program stored in the internal memory by the internal CPU.

Figure 4:
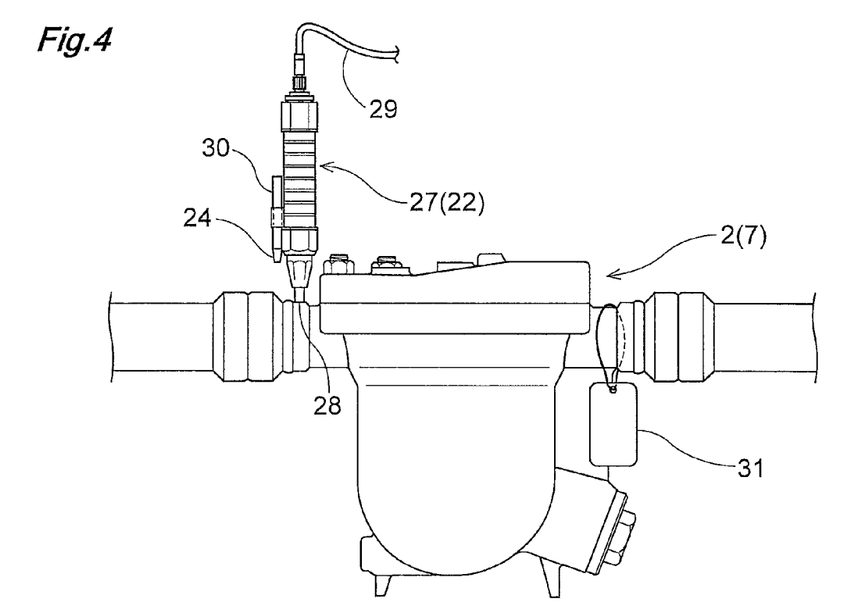
FIG. 4 a perspective view showing a mode of detection.

Further, the diagnosing device 22 includes a probe 27. At the leading end of this probe 27, there is attached a sensor 28 for detecting ultrasonic oscillation and temperature of the outer surface of the trap when pressed against this outer surface of the trap 2 as illustrated in FIG. 4. The detection information of oscillation and temperature obtained by the sensor 28 is inputted to the diagnosing device 22 via a connecting wire 29 (or wireless communication means such as infrared communication means).

The ID tag reader 24 is mounted to the leading end of an arm 30 attached to the probe 27 to be switchable between a projected posture indicated by the chain line in FIG. 3 and a retracted posture indicated by the solid line in the same. In operation, with setting the arm 30 to the projected posture, when the ID tag reader 24 is brought to the vicinity of an ID tag 31 provided adjacent each trap 2 (at least each trap 2 belonging in the direct collection group), the trap ID information of the corresponding trap 2 recorded in this ID tag 31 is read by the ID tag reader 24 and then inputted to the diagnosing device 22.

The portable computer 23 includes a keyboard 32, a touch pen 33 as an operation aid, a mouse (not shown), a display 34 (an example of "displaying section"), an internal CPU (an example of the "calculating section"), an internal hard disc (an example of the "storing section"), and an internal wireless modem. This portable computer 23 is operated in response to execution of a management program stored in the internal memory by the internal CPU.

Further, the portable computer 23 is connected with the diagnosing device 22 for allowing bidirectional communication therewith via a connecting wire 35 (or wireless communication means such as infrared communication means). Then, the trap ID information read by the ID tag reader is inputted not only to the diagnosing device 22, but also to the portable computer 23.

The internal memory of the diagnosing device 22 stores therein the trap property information. The diagnosing device 22 retrieves the trap property information from the internal memory of a trap 2 specified by the trap ID information read by the ID tag reader 24. and then correlates this read trap property information with decision reference information (e.g. trap type, correlation data such as temperature, oscillation, steam leak amount, etc.) also stored in the same internal memory, thereby to estimate the steam leak amount, thus determining whether this diagnosed trap 2 is under normal condition or abnormal condition and determining also the type and the degree of the abnormality such as the amount of leak, the free discharge, clogging, etc.

And, for each trap 2 of management interest, together with the trap reference information inputted by the keys 25 or the like, the result of decision of whether the device being normal or abnormal, the type of abnormality are stored as trap diagnosis result information in the internal memory in correlation with the trap ID information and the trap property information and transmitted to the portable computer 23.

Further, the internal hard disc of the portable computer 23 stores therein a management database having a similar construction to that stored in the central control apparatus 3. Upon transmission thereto of the sensor detection information, the trap diagnosis result information and the trap reference information from the diagnosing device 23 in the manners described above, this portable computer 23 effects recording, as its database updating function, of these sensor detection information, the trap diagnosis result information and the trap reference information transmitted from the diagnosing device 22 in the management database, for the trap 2 of interest specified by the trap ID information correlated thereto.

For those traps 2 belonging in the direct collection group 7, there is implemented the collecting method in which device-condition information are collected one after another in accumulating manner in the internal memory of the diagnosing device 22 by a detecting operation of the diagnosing device 22 (i.e. a contacting operation of the probe 27 of the diagnosing device 22) by a diagnosing person ("a collecting person") and transmitted to the portable computer 23 to be recorded in the accumulating manner in the management database of the hard disc therein.

Figure 5:
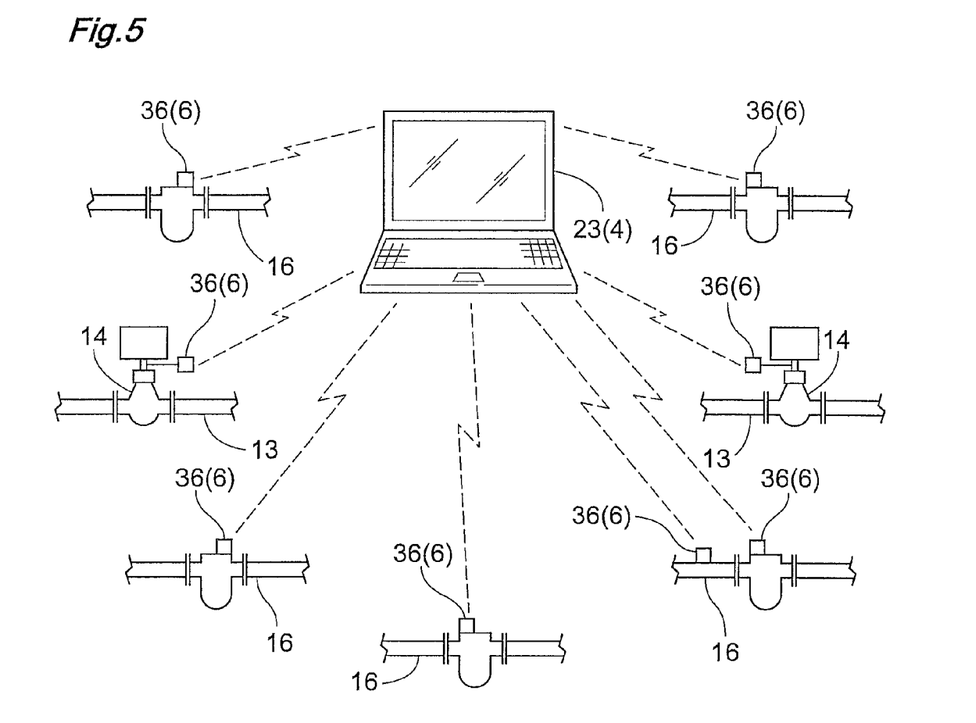
FIG. 5 a system construction diagram of a second indirect collection group.

As shown in FIG. 5, the second stationary unit 6 comprises a digital circuit section using a digital processor, an analog circuit section, a communicating section for transmission and receipt of information to/from the portable computer 23 via the wireless communication, a sensor (not shown) of the same type as the above-described sensor 10, a power cell, a small sensor-equipped terminal device 36 incorporating a storing section for recording setting information, etc.

As the communicating section of the sensor-equipped terminal device 36, since it will suffice for this section to be capable of communication over a shorter communicable distance than the distance of the communication between the terminal device 9 and the relay device 11, there is employed a communicating section having a shorter communicable distance, thus being less expensive and consuming less power than the communicating section of the terminal device 9.

In operation, in accordance with an instruction provided via the wireless communication from the portable computer 23 which has been transported to a relatively near position, the sensor-equipped terminal device 36 transmits the sensor detection information of the corresponding trap 2 and effects digital processing thereon and then transmits the processed information to the portable unit 4 and also receives the instruction information from the portable unit 23.

Incidentally, as the sensor-equipped terminal device 36, there is conveniently employed a device that uses, as its internal sensor, the opening/closing sensor 15 for detecting an opened/closed condition (still another example of the "device-condition information") of the valve 14 incorporated within the steam feed pipe 13 of the steam line incorporating each trap 2 and the pressure sensor 17 for detecting a pipe pressure (still another example of the "device-condition information") inside the condensate pipe 16 connected to each trap 2.

Then, in accordance with the sensor detection information sent from each sensor-equipped terminal device 36, the internal CPU of the portable computer 23 diagnoses each trap 2 and then records the diagnosis result information (i.e. the trap diagnosis result information described above) and the extracted trap reference information, in the accumulating manner in the management database, together with the sensor detection information, the operation number detection information.

That is, for those traps 2 belonging in the second indirect collection group 8b, there is employed a device-condition information collecting method according to which via the wireless communication between the second stationary unit 6 and the portable computer 23 (i.e. direct wireless communication), the device-condition information are recorded in the management database within the hard disc of the portable computer 23 via the second stationary unit 6.

Incidentally, there is provided an arrangement what enables, via the wireless communication between the portable computer 23 and the central control apparatus 3, mutual rewriting updating (butch updating, or partial updating of only new information of the date of data collection) between the management database on the side of the portable computer 23 and the management database on the side of the central control apparatus 3.

Also, the portable computer 23 is configured to be capable of collecting device-condition information of the trap 2 corresponding to the first stationary unit 5 via the wireless communication with this first stationary unit 5, in response to a movement of the stationary unit 5 to a nearby location by an information collecting person or in accordance with an instruction transmitted from the portable computer.

Figure 6:
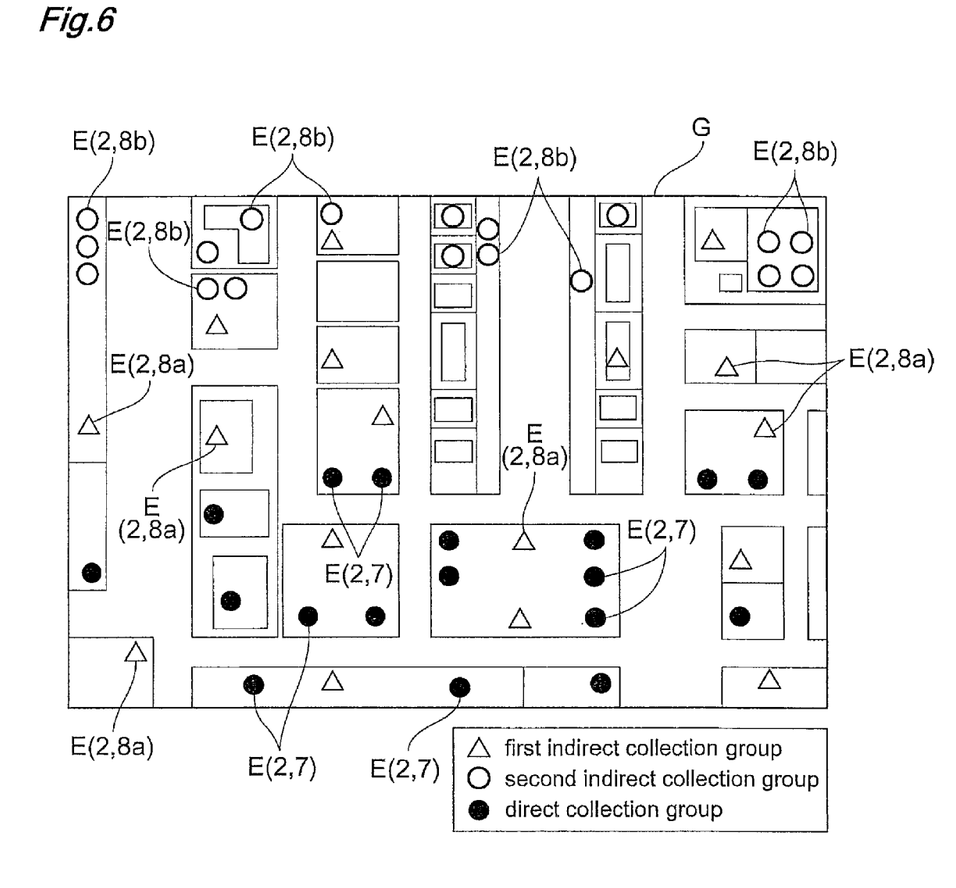
FIG. 6 a diagram showing a mode of displaying of graphic image of facility layout, and FIG. 7 a perspective view of a portable unit relating to a further embodiment.

Further, the portable computer 23 has a mapping function for the operation by the information collecting person. With this function in operation, a schematic facility layout graphic image G showing the facility 1 as shown in FIG. 6 is displayed on the display 34 based on facility layout information stored in the internal hard disc and also icons E representing respective traps 2 of management interest are displayed on the display 34 in superposition with the schematic facility layout graphic image G in a layout corresponding to the actual positions of the traps based on the layout information of the respective traps 2 stored also in the same internal hard disc. In doing this, by means of difference of mode of displaying the icons E, the collection groups the corresponding traps 2 belong in are indicated.

The management of the number of traps 2 implemented with using the above-described information collecting kits 3-6 are carried out according to the following steps (a) through (h).

(a) Through discussion with the client for trap management, a diagnosing person determines which of the traps 2 in the facility 1 are to be designated as the traps 2 to be managed. That is, through the discussion with the client, decision will be made whether all of the traps 2 in the facility 1 are to be targets for management or only the traps of a particular section(s) are to be management targets, or whether the traps 2 belonging in a particular steam supply line in the facility 1 are to be the management targets, etc.

(b) Then, the diagnosing person will create facility information and trap layout information, based on e.g. a facility layout diagram, a piping system diagram provided from the client and then inputs and stores these created information, i.e. the facility information and the trap layout information in the internal hard disc of the portable computer 23 of the portable unit 4.

(c) The diagnosing person will move with carrying with him/her the portable unit 4, in the course of which with reference to the facility layout graphic image G and the icons E shown on this facility layout graphic image G displayed on the display 34 of the portable computer 23, the diagnosing person will move to the location of each trap 2 to be managed for effecting affixing of an ID tag 31 to each trap 2 and reading of the trap ID information with using the ID tag reader 24, thus recording the respective information of each managed trap 2 in the management database of the internal hard disc of the portable computer 23 and effecting also correlating between the trap ID information and the ion E for each of the traps 2 by e.g. an operation of a touch pen 33.

Further, in addition to the affixing of the ID tag 31 and the reading of the trap ID information, the diagnosing person will check the trap property information and the trap reference information for each trap 2 and write these trap property information and trap reference information into the management database of the portable computer 23 with e.g. an operation of the touch pen 33. With completion of these series of operations, there is created a new management database for all of the traps 2 to be managed.

Moreover, in addition to the above operations, i.e. affixing of the ID tag 31, reading of the trap ID information, writing of the trap property information and trap reference information, and writing of the trap property information and trap reference information from the management database in the portable computer 23 to the internal memory of the diagnosing device 22 for each trap 2, the person will then effect diagnosis of each trap with using the diagnosing device 22 and input and store the information on the result of the diagnosis, the sensor detection information, in the memory 8 of the diagnosing device 22.

(d) Then, based on the result of trap diagnosis of all of the traps 2 recorded in the management database of the portable computer 23, the diagnosing person will report to the client the situations and actual current conditions (e.g. defect ratio, the total amount of steam leak, monetary loss due to steam loss, etc.) of all the management target traps 2. Then, through another discussion with the client, the diagnosing person will implement, as an initial replacement, either total replacement for replacing all the traps 2 by new recommended traps or partial replacement for repairing or replacing only the defective traps 2 by new recommended traps.

(e) After implementation of the above-described initial replacement, the diagnosing person will have still another discussion with the client to decide, to which group each of the managed traps 2 is to be set, i.e. the direct collection group 7, the first indirect collection group 8a, or the second indirect collection group 8b, in accordance with the situation (e.g. type, the installed location, the importance) and/or actual current conditions (the frequency of problem occurrence, the probability of problem occurrence, etc.) as well as the trap diagnosis result information collected in the initial operations. This decision is to be made in a "comprehensive" manner, with taking into consideration altogether such factors as collection frequency (timing), period required for collection, the collection work efficiency, the collection work cost, the system/device cost, etc.

For instance, the grouping of the number of traps 2 can be carried out as follows.

First, the diagnosing person set the frequency of collecting device-condition information for each of the traps 2, in accordance with the situation and the actual conditions thereof.

Next, of those traps 2 set with a same frequency, for each of the traps 2 set with a certain appropriate frequency such as the lowest collection frequency, the diagnosing person will determine whether the direct collection by the portable unit 4 is appropriate therefor or not, in the respect of the work efficiency, the facility cost, etc. And, the person will assign those traps 2 determined appropriate for the direct collection to the direct collection group 7.

Further, for those traps 2 determined inappropriate for the direct collection, the diagnosing person 2 will then exclude one or some of them deemed inappropriate for the indirect collection by the portable unit 4 in the respect of the work efficiency and assign the rest to the second collection group 8b basically.

Further, for those traps 2 set with different frequencies than the traps 2 set to the direct collection group 7, the diagnosing person will exclude one or some of them deemed inappropriate for the indirect collection by the central control apparatus 3 in the respect of the facility cost and assign the rest to the first indirect collection group 8a basically.

(f) The diagnosing person will record the information on the collection group of each trap 2, as the trap group information, to the management database of the portable computer 23 by an operation of e.g. the keyboard 32 or the touch pen 33 and input and store these information in the management database of the internal hard disc of the central control apparatus 3 by copying the information from the management database of the portable computer 23 via wireless communication between the portable computer 23 and the central control apparatus 3.

Further, for those traps 2 set to the first indirect collection group 8a, the diagnosing person will install the first stationary units 5 therefor in the facility 1 and for those traps 2 assigned to the second indirect collection group 8b, the diagnosing person will install the second stationary units 6 therefor in the facility 1.

(g) In the process of the diagnosing person's repeating the cycles of above-described implementation of information collecting operations for collecting the device-condition information of the traps 2 with using the collecting kits 3-6, for each cycle of collecting, the diagnosing person will record additionally the sensor detection information and the trap diagnosis result information of each trap 2 in the management database and will repair or replace each defective trap, if any, by a recommended trap.

(h) At an appropriate timing in the course of each cycle of collecting, the diagnosing person will analyze the use condition or cause of trouble if any for each managed trap 2 with using the management database in the central control apparatus 3 or the portable computer 4 and also will determine appropriateness of the collection group set for each trap and selection of the type suitable therefor. Then, based on the results of these, if necessary, the diagnosing person may effect some measure for improvement such as changing of the collection group for each trap 2 or improvement of the setting condition of each trap 2.

Other Embodiments

Next, other embodiments of the invention will be described respectively.

Figure 7:
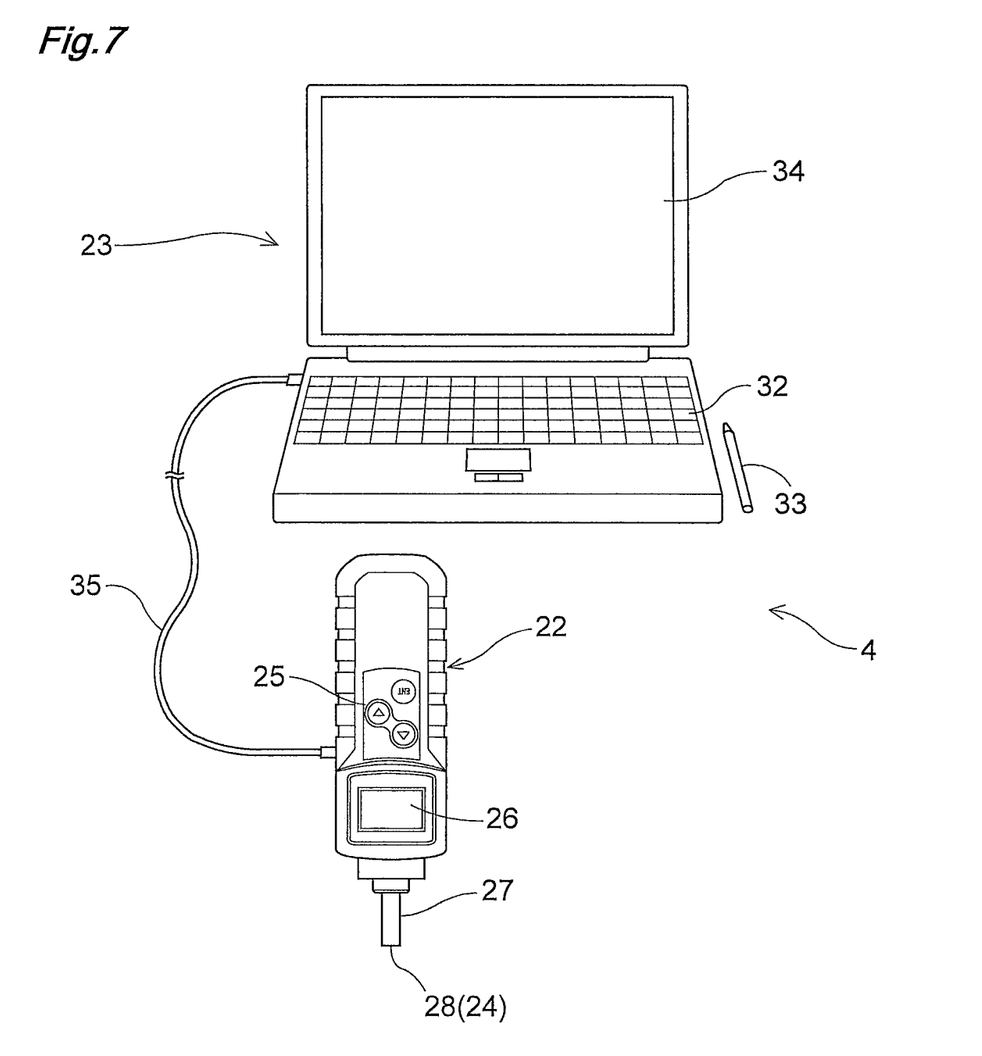

The diagnosing device 22 is not limited to the device used and described in the foregoing embodiment, in which the probe 27 and the ID tag reader 24 are provided as separate components. Instead, as shown in FIG. 7, the diagnosing device 22 may include the probe 27 and the ID tag reader 24 as one integral unit. Meanwhile, in the further embodiment shown in FIG. 7, both the sensor 28 and the ID tag reader 24 are mounted at the leading end of the probe 27 assembled with the diagnosing device 22. Further, like the one described in the foregoing embodiment, this diagnosing device 22 too is configured to be capable of bidirectional communication with the portable computer 23 via the connecting wire 35 (or wireless communication means such as infrared communication means).

In the foregoing embodiment, there was explained a case wherein two kinds of stationary units, i.e. the first stationary unit 5 and the second stationary unit 6 are employed as units having different communicable distances from each other. Instead, only one common type may be employed. Or, three or more kinds thereof can be employed, with communicable distances thereof being set in accordance with the individual traps 2 or the individual area of the trap 2.

In the foregoing embodiment, there was explained an exemplary arrangement in which for the indirect collection group, the device-condition information are collected via the communication between the stationary unit and the central control apparatus 3 or the portable unit 4. Instead, there can be employed a different arrangement wherein the device-condition information are collected via communication between the stationary unit and some dedicated device or instrument other than the central control apparatus 3 or the portable unit 4.

In the foregoing embodiment, the indirect collection group is further divided into the two groups. Instead, this indirect collection group can be divided into three or more groups or not divided at all.

In the foregoing embodiment, the direction collection group 7 is not divided any further. Instead, this group can be further divided according to the types of the portable unit 4 for instance.

The specific method of dividing the number of managed devices into groups is not limited to these described in the foregoing embodiment. Any of a variety of methods can be employed, in accordance with the situation or actual current conditions of the respective managed devices or the condition or situation of the managing person or the diagnosing person.

The central control apparatus 3, the portable unit 4, the stationary units 5, 6 are not limited to those described in the foregoing embodiment, but can be modified in many ways.

In the foregoing embodiment, the first stationary unit 5 is comprised of the terminal device 9, the sensor 10 and the relay device 11. Instead, this unit 5 can be comprised of a sensor-equipped terminal device like the second stationary unit 6 or comprised of a plurality of relay devices capable of "stepwise" communication with the sensor-equipped terminal device.

Further, in the foregoing embodiment, there was explained an exemplary arrangement wherein the second stationary unit 6 is comprised of a sensor-equipped terminal device 36. Instead, this can be comprised of a sensor-equipped terminal device and a relay device or of a terminal device and a sensor just like the first stationary unit 5. Or, the unit can be comprised of the terminal device, the sensor and the relay device.

Further, for instance, in the foregoing embodiment, there was explained an exemplary arrangement wherein the portable unit 4 is comprised of a portable computer 23 and a diagnosing device 22. Instead, the portable unit 5 can be comprised of the diagnosing device 22 only.

In the foregoing embodiment, there was explained an exemplary arrangement wherein the modes of communication between the central control apparatus 3 and the first stationary unit 5 and between the portable unit 4 and the second stationary unit 6 are wireless communication. Instead, these communications can be wired communications.

In the foregoing embodiment, there was explained an exemplary arrangement wherein the steam traps 2 are the devices to be managed. Instead, the managed devices or devices of management interest can be various kinds of valves, tanks or producing machines, etc.

The present invention is applicable not only to the facility using steam, but also to various kinds of facilities that include many devices or instruments using electricity, gas, etc.

The diagnosing device 22 is not limited to the one described in the foregoing embodiment that is configured to detect ultrasonic oscillation and temperature of the outer surface of a device by an operation of contacting the outer surface of the device. Instead, the diagnosing device 22 can be configured to detect ultrasonic oscillation by an operation of orienting such ultrasonic detecting means as a directional microphone to a posture toward the outer surface of the device (an example of ultrasonic oscillation detecting posture) for detecting the ultrasonic oscillation generated from the device (an example of detecting operation).

In the foregoing embodiment, there was explained an exemplary arrangement wherein the dividing of many traps 2 into groups is done by a diagnosing person. However, this group dividing operation can be effected by any other person or entity than the diagnosing person. Or, this group dividing operation can be effected by a computer that stores therein a group dividing program.

INDUSTRIAL APPLICABILITY

The present invention can be suitably and advantageously used for management of a great number of devices installed in a factory or plant.

DESCRIPTION OF REFERENCE MARKS/NUMERALS 2 device to be managed
3 central control apparatus
4 portable unit
5 stationary unit, first stationary unit
6 stationary unit, second stationary unit
7 direct collection group
8a indirect collection group, first indirect collection group
8b indirect collection group, second indirect collection group

The invention claimed is:

1. A device-condition information collecting method for collecting device-condition information of each of a number of devices to be managed, comprising:
performing, by a portable unit including a sensor for device-condition detection, a detecting operation on each managed device of a direct collection group having at least one managed device;
collecting, by the portable unit for device-condition detection, device-condition information of each managed device of the direct collection group having at least one managed device;
performing, by a stationary unit including at least one sensor for device-condition detection, a detecting operation on each managed device of an indirect collection group having at least one managed device; and
collecting, by the stationary unit, device-condition information of each managed device of the indirect collection group having at least one managed device, wherein the stationary unit is disposed to be capable of detecting the device-condition information of each managed device for the device-condition detection,
wherein each of the number of devices to be managed is associated with a frequency of collecting the device-condition information in accordance with at least one of a situation and an actual current condition thereof, the method further comprising:
collecting, by the portable unit, the device-condition information of all or some of the managed devices having a same collection frequency as the managed devices of the direct collection group; and
collecting, by the stationary unit, the device-condition information of the managed devices not in the direct collection group as the managed devices of the indirect collection group.

2. The device-condition information collecting method according to claim 1, further comprising:
communicating, by the stationary unit, the device-condition information of a first portion of the managed devices of the indirect collection group to a central control apparatus;
communicating, by the stationary unit, the device-condition information of a second portion of the managed devices of the indirect collection group to the portable unit; and
communicating, by the portable unit, the device-condition information of the second portion of the managed devices of the indirect collection group to the central control apparatus.

3. The device-condition information collecting method according to claim 2, wherein, if direct collection of the device-condition information using the portable unit is determined to be not appropriate for a particular managed device having the same collection frequency as the managed devices of the direct collection group, collecting, by the stationary unit, the device-condition information of the particular managed device, communicating, by the stationary unit, the device-condition information of the particular managed device to the portable unit, and communicating, by the portable unit, the device-condition information of the particular managed device to the central control apparatus.

4. A device-condition information collecting kit for use in the method according to claim 3, wherein the kit comprises said portable unit, said stationary unit and said central control apparatus.

5. A device-condition information collecting kit for use in the method according to claim 2, wherein the kit comprises said portable unit, said stationary unit and said central control apparatus.

6. A device-condition information collecting kit for use in the method according to claim 1, wherein the kit comprises said portable unit, said stationary unit and a central control apparatus capable of collecting the device-condition information detected by said stationary unit.

7. The device-condition information collecting kit according to claim 6, wherein said portable unit is configured to be capable of collecting device-condition information of the managed devices of the first indirect collection group via wireless communication with the stationary units operatively connected to the managed devices of the first indirect collection group.

8. The device-condition information collecting kit according to claim 7, wherein, via wireless communication between the portable unit and the central control apparatus, device-condition information of the direct collection group, device-condition information of the first indirect collection group and device-condition information of the second indirect collection group can be stored altogether in a storing section of said portable unit and/or a strong section of said central control apparatus.

9. The device-condition information collecting kit according to claim 6, wherein,. via wireless communication between the portable unit and the central control apparatus, device-condition information of the direct collection group, device-condition information of the first indirect collection group and device-condition information of the second indirect collection group can be stored altogether in a storing section of said portable unit and/or a storing section of said central control apparatus.

10. A device-condition information collecting kit for use in a method of collecting device-condition information of each of a number of devices to be managed, the kit comprising:
a portable unit including a sensor for device-condition detection, the portable unit being capable of performing a detecting operation on each managed device and collecting device-condition information from each managed device;

a stationary unit including a sensor for device-condition detection and disposed to be capable of performing a detecting operation on a managed device and collecting device-condition information from the managed device, the stationary unit being capable of communicating the device-condition information; and a central control apparatus capable of collecting the device-condition information by communicating with the stationary unit, wherein each of the number of devices to be managed is associated with a frequency of collecting the device-condition information in accordance with at least one of a situation and an actual current condition thereof, wherein the portable unit is capable of collecting the device-condition information of all or some of the managed devices having a same collection frequency as the managed devices of a direct collection group, and wherein the stationary unit is disposed to be capable of collecting the device-condition information of the managed devices not in the direct collection group as the managed devices of an indirect collection group.

11. A device-condition information collecting kit for use in a method of collecting device-condition information of each of a number of devices to be managed, wherein the kit comprises:

a portable unit including a sensor for device-condition detection, the portable unit being capable of performing a detecting operation on each managed device and collecting device-condition information from each managed device; and a stationary unit including a sensor for device-condition detection, the stationary unit being capable of performing a detecting operation on a managed device and collecting device-condition information from the managed device, the stationary unit being capable of wirelessly communicating the device-condition information;

wherein said portable unit is configured to be capable of collecting the device-condition information by wirelessly communicating with the stationary unit, wherein each of the number of devices to be managed is associated with a frequency of collecting the device-condition information in accordance with at least one of a situation and an actual current condition thereof, wherein the portable unit is capable of collecting the device-condition information of all or some of the managed devices having a same collection frequency as the managed devices of a direct collection group, and wherein the stationary unit is capable of collecting the device-condition information of the managed devices not in the direct collection group as the managed devices of an indirect collection group.

12. A device-condition information collecting kit for use in a method of collecting device-condition information of each of a number of devices to be managed, wherein the kit comprises:

a portable unit including a sensor for device-condition detection, the portable unit being capable of detecting operation on each managed device and collecting device-condition information from each managed device;

a stationary unit including a sensor for device-condition detection, the stationary unit being capable of a detecting operation on a managed device and collecting device-condition information from the managed device, the stationary unit being capable of wirelessly communicating the device-condition information; and a central control apparatus capable of collecting the device-condition information detected by the stationary unit by wirelessly communicating with the stationary unit;

wherein said portable unit is configured to be capable of collecting the device-condition information detected by the stationary unit by wirelessly communicating with the stationary unit, wherein each of the number of devices to be managed is associated with a frequency of collecting the device-condition information in accordance with at least one of a situation and an actual current condition thereof, wherein the portable unit is capable of collecting the device-condition information of all or some of the managed devices having a same collection frequency as the managed devices of a direct collection group, and wherein the stationary unit is capable of collecting the device-condition information of the managed devices not in the direct collection group as the managed devices of an indirect collection group.

13. The device-condition information collecting kit according to claim 12, wherein said stationary unit includes a first stationary unit for wireless communication with said central control apparatus and a second stationary unit for wireless communication with said portable unit, said second stationary unit having a shorter wireless communicable distance than said first stationary unit.

* * * * *

UNITED STATES PATENT AND TRADEMARK OFFICE
CERTIFICATE OF CORRECTION

PATENT NO.         : 9,060,211 B2
APPLICATION NO.    : 13/139805
DATED              : June 16, 2015
INVENTOR(S)        : Mamoru Nagase Page 1 of 1

It is certified that error appears in the above-identified patent and that said Letters Patent is hereby corrected as shown below:

In the Claims

Column 16, Line 55, Claim 9, delete "wherein,." and insert -- wherein, --

Column 18, Line 12, Claim 12, after "capable of" insert -- a --

Signed and Sealed this
Twenty-second Day of December, 2015

Michelle K. Lee
*Director of the United States Patent and Trademark Office*